(12) United States Patent
Haas

(10) Patent No.: US 9,061,662 B2
(45) Date of Patent: Jun. 23, 2015

(54) METHOD AND DEVICE FOR CONTINUOUSLY DETERMINING WHEEL STATE VARIABLES OF A WHEEL

(75) Inventor: Thomas Haas, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 219 days.

(21) Appl. No.: 13/146,092

(22) PCT Filed: Jan. 18, 2010

(86) PCT No.: PCT/EP2010/050527
§ 371 (c)(1),
(2), (4) Date: Jul. 25, 2011

(87) PCT Pub. No.: WO2010/084098
PCT Pub. Date: Jul. 29, 2010

(65) Prior Publication Data
US 2011/0282548 A1    Nov. 17, 2011

(30) Foreign Application Priority Data

Jan. 23, 2009 (DE) .................. 10 2009 005 904

(51) Int. Cl.
*B60T 8/172* (2006.01)
*B60T 17/22* (2006.01)
(52) U.S. Cl.
CPC .......... *B60T 8/1725* (2013.01); *B60T 2240/04* (2013.01)
(58) Field of Classification Search
CPC .................. B60T 2240/04; B60C 23/0408
USPC .................. 701/36; 702/97–98; 340/442
See application file for complete search history.

(56) References Cited

U.S. PATENT DOCUMENTS

| 6,278,361 | B1 | 8/2001 | Magiawala et al. | |
|---|---|---|---|---|
| 6,539,295 | B1 | 3/2003 | Katzen et al. | |
| 6,650,986 | B1 * | 11/2003 | Burgdorf et al. | 701/70 |
| 7,082,359 | B2 * | 7/2006 | Breed | 701/36 |
| 7,248,953 | B2 | 7/2007 | Ogawa | |
| 7,665,353 | B2 * | 2/2010 | Oshiro | 73/146 |
| 8,035,502 | B2 | 10/2011 | Heise et al. | |
| 8,402,821 | B2 * | 3/2013 | Fink et al. | 73/146.5 |
| 2003/0216845 | A1 * | 11/2003 | Williston | 701/36 |
| 2004/0207518 | A1 | 10/2004 | Tamimi et al. | |
| 2005/0188754 | A1 * | 9/2005 | Ogawa | 73/146 |
| 2008/0178667 | A1 | 7/2008 | Kusunoki | |

(Continued)

FOREIGN PATENT DOCUMENTS

| DE | 102005062872 A1 | 3/2007 |
|---|---|---|
| DE | 102006053827 A1 | 6/2007 |
| DE | 10 2007 010 780 A1 | 12/2007 |

(Continued)

*Primary Examiner* — Helal A Algahaim
*Assistant Examiner* — Nga X Nguyen
(74) *Attorney, Agent, or Firm* — Laurence A. Greenberg; Werner H. Stemer; Ralph E. Locher

(57) ABSTRACT

In order to more accurately determine wheel state variables of a wheel, physical variables of the wheels are continuously measured and evaluated on the vehicle side. In addition, physical variables of the wheel are intermittently measured on the wheel side. The variables measured on the wheel side or the evaluated measurement results thereof are used to correct the variables measured on the vehicle side and/or the determined wheel state variables.

9 Claims, 4 Drawing Sheets

(56) References Cited

U.S. PATENT DOCUMENTS

| | | |
|---|---|---|
| 2008/0281552 A1 | 11/2008 | Irth et al. |
| 2010/0179718 A1 | 7/2010 | Kobe et al. |

FOREIGN PATENT DOCUMENTS

| | | | |
|---|---|---|---|
| DE | 102007010781 A1 | 12/2007 | |
| DE | 60037097 T2 | 9/2008 | |
| DE | 10 2007 023 069 A1 | 11/2008 | |
| DE | 102007029870 A1 | 1/2009 | |
| JP | 7-103834 A | 4/1995 | |
| JP | 1120427 A | 1/1999 | |
| JP | 2004074892 A | 3/2004 | |
| JP | 2005164337 A | * | 6/2005 |
| JP | 2008281175 A | 11/2008 | |

* cited by examiner

METHOD AND DEVICE FOR CONTINUOUSLY DETERMINING WHEEL STATE VARIABLES OF A WHEEL

BACKGROUND OF THE INVENTION

Field of the Invention

The invention relates to a method and to a device for continuously determining wheel state variables of a wheel.

In vehicles, driving safety plays an important role, in particular in vehicle movement dynamic situations. In this respect, the detection of static or dynamic physical variables, relating to the state of the tires or of the wheels, such as the tire pressure or the wheel load, is an important input variable for controlling and improving driving safety. At present, such input variables can be determined precisely only with a very high degree of expenditure or can be detected only over a very long time period. Many physical variables can only be determined indirectly by derivation from third variables.

The determination of static or dynamic tire state variables or wheel state variables, such as for example the wheel load, is usually carried out by additional systems on the vehicle. This means increased expenditure on additional components in the motor vehicle.

Static or dynamic tire state variables or wheel state variables can be detected by direct measurement in the tire by means of what are referred to as TPMS (tire pressure measurement system) devices, which are mounted on the rim or tire and measure the tire pressure and temperature in the tire, transmitting said tire pressure and temperature to a central evaluation unit in the motor vehicle for evaluation.

Such a TPMS device is described, for example, in German laid-open patent application DE 10 2007 007 135 A1. In this context, tire-specific parameters are transmitted from a wheel electronic system to a receiver device in the motor vehicle. The receiver device has a signal-processing device which performs evaluation of the picked-up transmission signals and/or evaluation of picked-up signals from other users in the motor vehicle.

German laid-open patent application DE 10 2007 023 069 describes a method with which the cargo of a motor vehicle is detected on the basis of an analysis of the lengths of the tire contact areas which occur, in particular, during braking, acceleration or during cornering.

However, these known systems have only been used to a restricted degree, which is due, on the one hand, to the short service life when the measuring devices arranged on the wheel side have an increased transmission interval time, in particular the battery in the wheel, or, on the other hand, as a result of legal regulations. These increased transmission interval times are necessary in the case of functions which are relevant to safety. For example, the FCC (Federal Communications Commission) in the USA requires that information in a motor vehicle must be capable of being transmitted in a wireless fashion or by radio only at relatively long time intervals. According to the FCC, radio systems, such as for example a tire pressure system (TPMS), usually transmit a data telegram only every 10 s, except when there is a hazardous driving state. Then, an increased transmission frequency is permitted for a certain time period on an exceptional basis. In general, data telegrams are transmitted every 60 seconds.

Vehicle-side measuring devices cannot measure the tire state variables or wheel state variables precisely enough, since they only measure the corresponding physical variables indirectly from outside the wheel or derive the corresponding variables from indirect measurements.

BRIEF SUMMARY OF THE INVENTION

The invention is based on the object of providing a method and a device for determining tire state variables or wheel state variables of a wheel, in which the tire state variables or wheel state variables can be determined continuously and largely in a precise fashion without additional expenditure.

This object is achieved by means of a method as claimed and/or by means of a device as claimed.

In the invention, physical variables of a wheel are measured continuously on the vehicle side and, if appropriate, evaluated in order to determine one or more wheel state variables. Physical wheel state variables are measured directly in the wheel on an intermittent basis. The determined wheel state variables or the variables measured on the vehicle side are corrected using the variables measured on the wheel side.

Elements of devices which are used in the motor vehicle in any case, such as a brake control unit, driving stability control unit or other control units, are advantageously used in order to use, with these elements, physical variables which are measured in any case as physical variables which are measured on the vehicle side.

Advantageous refinements and developments of the invention can be found in the dependent claims and the description in combination with the figures in the drawing.

The refinements and developments of the invention can be combined with one another in any desired suitable way.

The present invention will be explained in more detail below on the basis of the schematic exemplary embodiments which are given in the schematic figures in the drawing. In the drawing:

DESCRIPTION OF THE INVENTION

Figure 1:
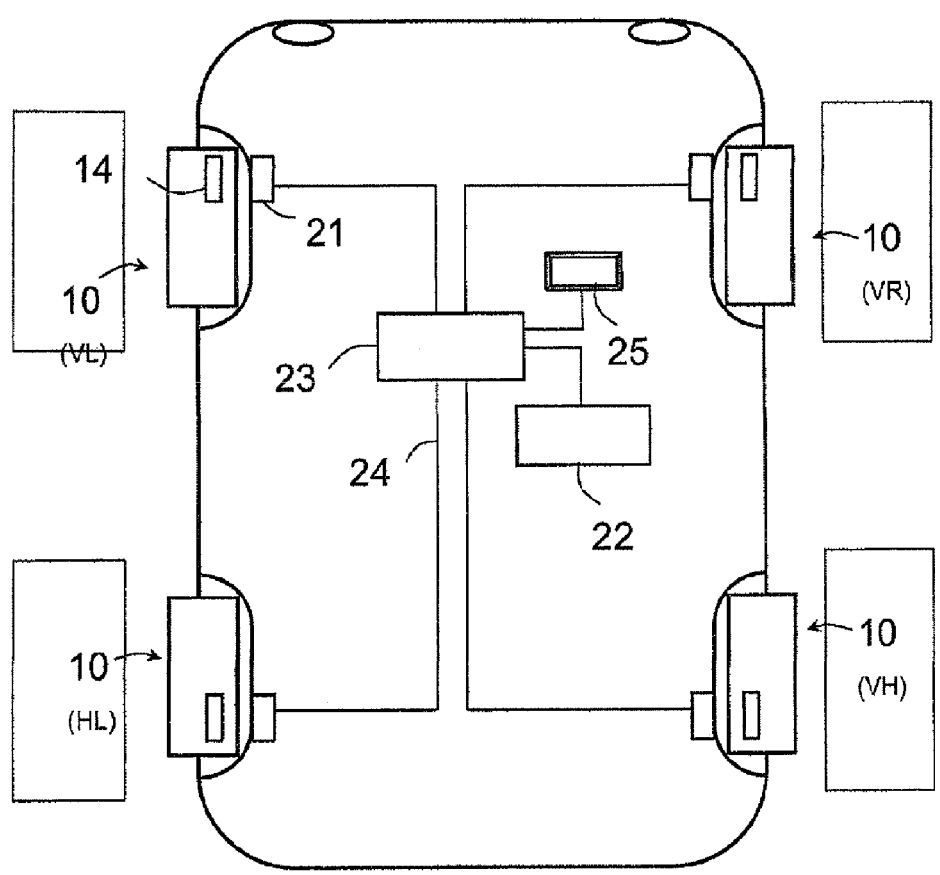
FIG. 1 shows a block circuit diagram of a device according to the invention for continuously determining tire state variables or wheel state variables of a motor vehicle wheel.

In the figures in the drawings, identical and functionally identical elements and features are provided with the same reference symbols unless otherwise stated.

In the text which follows, the invention will be explained in more detail as an exemplary embodiment on the basis of the use in a motor vehicle. The method and the device for determining physical wheel state variables can, of course, be used not only in wheels of a motor vehicle but also in those a motorcycle, of a truck or of some other utility vehicle. Likewise, it is possible to correspondingly determine tire state variables or wheel state variables in aircraft wheels.

FIG. 1 shows a schematic block circuit diagram of a device in a motor vehicle for determining physical wheel state variables or tire state variables (referred to below as a wheel state variable or wheel variable) of a motor vehicle wheel 10 or of a motor vehicle tire.

A vehicle wheel 10 usually has a rim 11 (see FIG. 2) with tires 12 fitted thereon. The tires 12 can be without an inner tube or else have an inner tube. Such wheels 10 with corresponding tires 12 can be used in a variety of objects for driving. In the text which follows, mention will only be made generally of a wheel 10 (unless the tire 12 or the rim 11 or some other part of the wheel 10 is expressly meant).

The device according to the invention has vehicle-side structures 21 which are arranged in the vicinity of the wheel 10. It will be assumed that in one preferred embodiment these structures are embodied as wheel electronic systems 21. The wheel electronic systems 21 are used to measure wheel-specific or tire-specific physical characteristic variables, such as the rotational speed of a wheel 10, mechanical deformation of the wheel 10/tire g etc. The measured values are passed on to a further-processing device.

The measured values can be transmitted from the vehicle-side wheel electronic systems 21 to control units 22, such as an ABS control unit (anti-lock brake system), EPS control unit (electronic stability program) for controlling the vehicle movement dynamics of the motor vehicle etc. which are arranged in any case in the motor vehicle. The measured values are also available to any other control unit in the motor vehicle if the measured values are "placed" on a data bus or data/signal lines 24 if the control units are connected to the data bus. The measured values can additionally be fed to a central control and evaluation unit 23 if the latter is not connected to the data bus. The wheel variables which are to be determined are determined from the measured values in the control and evaluation unit 23.

Such indirect determination (indirect because the physical variables are not measured in the tire 10) of a tire state variable or wheel state variable, such as for example the wheel load, is known from German laid-open patent application DE 10 2007 023 069 A1, the description of which is included herewith as part of the disclosure of the present application. Said document describes how the wheel load is determined by measuring physical characteristic variables of the wheels by means of measuring devices which are arranged on the vehicle side.

The vehicle-side wheel electronics 21 can have various sensors (such as a rotational speed sensor), transmitter and receiver units and electronic units.

On the wheel side, the physical characteristic variables of the wheels 10 can be measured directly in the wheel. For this purpose, wheel electronic systems 14 are arranged in the wheels 10, which systems can have sensor elements 13 (such as a tire pressure sensor, temperature sensor, deformation sensor etc.), transmitter and receiver units (not illustrated in the drawing) as well as electronic units including a power supply arranged in one wheel 10 in each case. The sensor elements 13 directly measure various physical variables of the wheel/tire such as, for example, the tire pressure, temperature, length of the tire contact area and/or wheel load and transmit the measured values to the motor vehicle for evaluation.

In every wheel 10 (front left (VL), front right (VR), rear left (HL) and rear right (HR)) which rotates during travel there is such a wheel-side wheel electronic system 14. The measured values are transmitted in a signal in a wireless fashion to the motor-vehicle-side receiver unit via antennas or by means of contacts.

The transmission signals can also be transmitted with such an amplitude or signal strength that the position of the receiver unit is not significant and the signals of each antenna in the wheel 10 can be transmitted satisfactorily to a single, central receiver unit (the latter is not illustrated in the figures) in the motor vehicle.

However, it is advantageous here if the respective devices in the wheel 10 are encoded individually, wherein this encoding should correspond to a wheel position. This encoding—or else referred to as a tire-specific code or wheel-specific code—is transmitted together with each measured value from the wheel to form a vehicle-side receiver device.

The assignment of the code to the wheel position can be firstly assigned or specified when initialization first takes place. When each encoding or code is assigned a wheel position during initialization, it is then possible later during the evaluation to assign a wheel position to each wheel state variable which has been determined from the measured values. It is therefore always known which wheel state variable is associated with which wheel position and which physical variable originates from which wheel (position).

Wherever wheel-side or tire-side devices are mentioned, a location on the wheel 10 is meant, irrespective of where the object is precisely arranged (inside or outside the tire 12, on the rim 11 etc.). The objects outside the wheel 10 but in the motor vehicle are referred to as on the vehicle side (for example objects on the wheel case in the vicinity of the wheels 10 or on the spring strut).

If the receiver units are each physically assigned to a wheel 10 in spatial terms, the received signals are subsequently passed on to the central control and evaluation unit 23 via signal lines 24 or a data bus. All the data from all the wheel electronic systems 21 are evaluated at said central control and evaluation unit 23. In the case of situations which are critical in terms of driving it is possible, if appropriate, to control a corresponding vehicle-specific function (either directly by means of the control and evaluation unit 23 or by means of a separate control unit 22), as a function of the respectively determined wheel state variable. In addition, an optical or acoustic display unit 25 can be activated for the driver, which informs the driver of such operationally relevant information.

The measured values and/or the wheel state variables which are determined can additionally be written into a diagnostic memory, from where they can be read out using a diagnostic unit.

So that the wheel state variables are available to the control units 22 as precisely and continuously as possible, the wheel state variables of each wheel 10 are determined by combining and evaluating physical variables which are measured continuously on the vehicle side, and by correction using physical variables which are measured intermittently on the wheel side.

For example, the wheel load can be determined as a wheel state variable by means of a vehicle-side wheel electronic system 14, 21 and a wheel-side wheel electronic system 21. This can be done in various possible ways.

In a first possible way, the wheel load is determined in accordance with the formula $$F \sim p*A \sim p*l*b$$

Here, F is the wheel load, p the tire pressure, A the contact area of the tire (also referred to as tire contact area), l is the length of the tire contact area (average) and b is the width of the tire. In order to be able to determine the wheel load F, the tire pressure p and the length of the tire contact area l must be measured. The width b of the tire depends on the fitted tires and is either known or can simply be measured.

The length l of the tire contact area can be determined by evaluating accelerations of the tire (acceleration force or centrifugal force) or deformations of the tread. This information is transmitted by radio to the motor vehicle for evaluation. Tire pressure measuring systems can measure the tire pressure on the wheel side or else on the vehicle side and transmit it to the control and evaluation unit 23. The length of the tire contact area can be measured on the vehicle side by deformation sensors in the wheel 10 or by oscillation sensors. The wheel load F can therefore be determined indirectly (on the vehicle side) or directly (on the wheel side).

However, a continuous determination of the wheel load F is possible only to a limited degree on the wheel side since, on the one hand, the power supply is not sufficient to transmit the measured values for the tire pressure or the deformation continuously (without interruption). The tire pressure measuring system usually transmits approximately every 60 seconds. If a measured value were to be transmitted on every rotation of the wheel 10, transmission would have to occur approximately 35 times per second at a high speed (for example 250 km/h). On the other hand, radio systems in the motor vehicle may, according to international standards, normally only transmit signals at least every 10 seconds (apart from in a safety-critical driving state). The radio systems are therefore in any case not configured to transmit continuously.

In order, nevertheless, to continuously make available reliable data relating to physical variables of the wheels 10, the physical wheel variables are measured continuously (indirectly) on the vehicle side even if the variables to be measured are caused by wheel-side components. At the same time, the same physical variables are measured on the wheel side (directly) on a regular basis (for example every 10 seconds or x seconds) or on an irregular basis, by wheel electronic units 14 arranged on the wheel side. I.e. the measured values are detected intermittently and subsequently transmitted to the vehicle-side control and evaluation unit 23.

The measured values which are measured on the wheel side are used, according to the invention, to correct correspondingly the variables which are measured continuously on the vehicle side if a marked difference should occur in the measured values. For this purpose, the measured values which are measured on the wheel side for the evaluation in the control and evaluation unit 23 are firstly compared with the measured values which are measured on the vehicle side. If there is a marked difference, either the measured values which are measured on the vehicle side are overwritten with the measured values which are measured on the wheel side, or correction factors are formed which correspondingly correct the wheel state variables determined on the basis of the measured values measured on the vehicle side. This is advantageous because the wheel-side measurements are usually more precise than the vehicle-side measurements.

For example, the wheel load F can be determined (for example according to the formula mentioned above) as a physical variable of the tire/wheel 10. Since all the other variables (tire pressure, width of the tire) can also be easily measured, the length l of the tire contact area then has to be calculated from the measured values for the centrifugal force or deformation of the tread of the tire 12.

Figure 2:
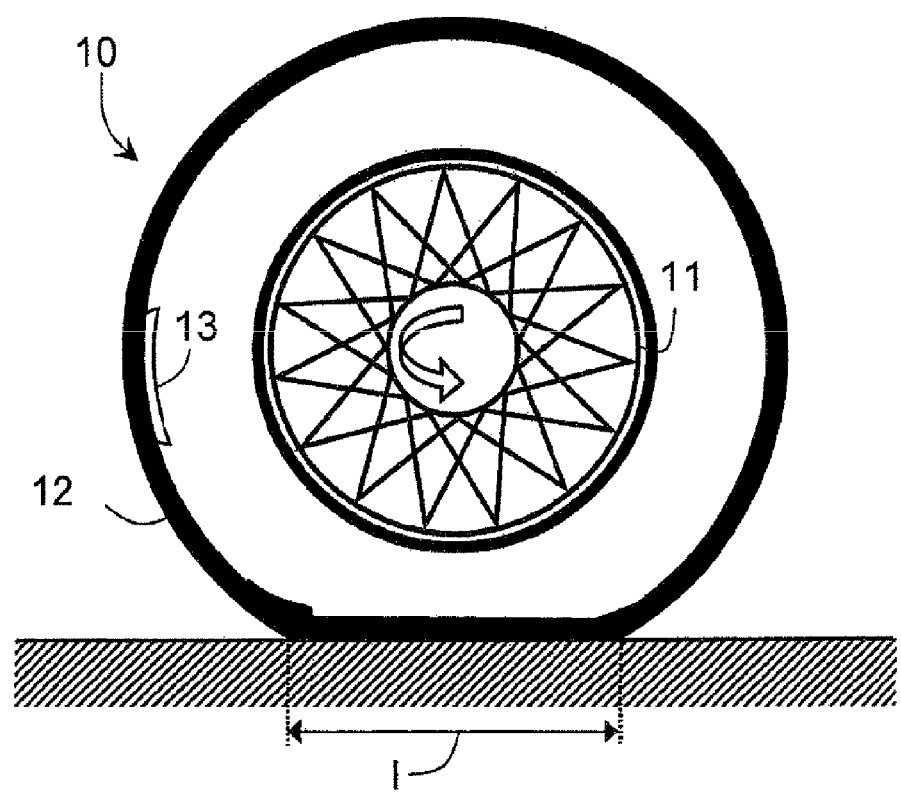
FIG. 2 shows a section through a motor vehicle wheel, in which part of the device according to FIG. 1 is arranged.

In FIG. 2 and in the further figures, a functionally identical or structurally identical elements have the same reference symbols as in FIG. 1. The tire contact area is, as illustrated in FIG. 2, that part of the tire which stays in contact with road over the length l of the tire contact area. Owing to the weight of the vehicle and to the elastic tire (depending on the rubber and tire pressure), the outer shape of the tread deviates from the circular shape.

The length of the contact area (l) can be calculated using the time t in which the tire contact area is travelled through when the wheel 10 rolls. For this purpose, the radial acceleration (centrifugal force; radial acceleration sensor) or the deformation of the tire 12 has to be measured.

Figure 3:
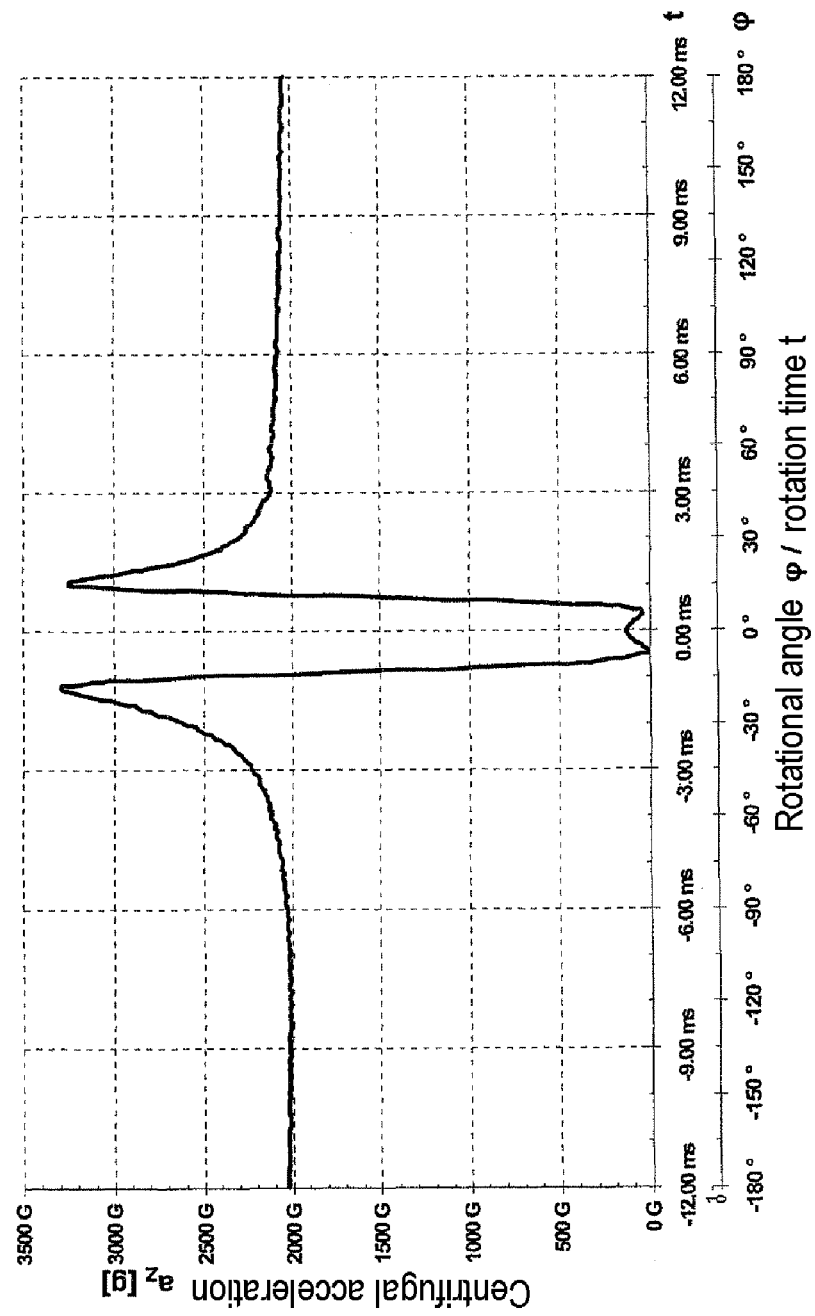
FIG. 3 shows a functional profile of the radial acceleration of a motor vehicle wheel as a function of the rotational angle of the wheel.

FIG. 3 illustrates the dependence of the centrifugal acceleration $a_z$ on the rotational angle $\phi$ (or the rotation time t) of the wheel 10. Depending on the current speed, one rotation of the wheel 10 takes a certain time t. The angular range $\Delta\phi$ in which the tire contact area is located therefore corresponds to a corresponding tire contact area run-through time $\Delta t$. The tire contact area run-through time $\Delta t$ is determined between the two maximum values of the function of the radial acceleration (evaluation of the illustrated function using mathematical methods or algorithms). The absolute minimum of the radial acceleration is located between them. According to FIG. 3, the tire contact area run-through time $\Delta t$ is somewhat less than 0.01 second.

The length l of the tire contact area can also be determined by vehicle-side measurement of wheel variables. If a mass element which is located in the interior of the tire (for example an air valve or wheel electronic system 14 for measuring the tire pressure) enters the tire contact area or leaves the tire contact area, a marked change occurs in the frequency spectrum, and said change can be detected by a vehicle-side wheel electronic system 21. If only the changes in the frequency spectrum are considered, the time between the changes on entering the tire contact area and on exiting the tire contact area corresponds to the tire contact area run-through time $\Delta t$.

However, the tire contact area run-through time $\Delta t$ can also be determined on the vehicle side by a frequency analysis, wherein for this purpose, for example, oscillations at the wheel suspension system, which are transmitted from the wheel to the wheel suspension system, are detected on the vehicle side. These oscillations are correspondingly evaluated in order to obtain the tire contact are run-through time $\Delta t$. For this purpose, wheel electronic systems 21, which are present in any case, of ABS or ESP control units 22, which are arranged in the vicinity of each wheel 10, can be utilized. The expenditure on the detection of wheel state variables is therefore kept low.

The tire pressure can be measured, on the one hand, in the tire using a tire pressure measuring system. On the other hand, it is possible to use indirect tire pressure measuring systems which determine the tire pressure indirectly on the vehicle side using ABS/ESP sensors. Such measuring methods are then referred to as indirect measuring methods.

The length l of the tire contact area can also be measured directly on the wheel side on the basis of the deformation, in particular in the entry region of the tire contact area and the exit region of the tire contact area, by means of deformation sensors in the tires. When the wheel rotates, a correspondingly arranged deformation sensor is deformed twice per rotation, specifically on entering the tire contact area and on exiting the tire contact area. The time between the two measurable deformations is the tire contact area run-through time $\Delta t$, from which the length l of the tire contact area can be determined together with the rotational speed of the wheel 10.

These measured values are not measured continuously for each wheel 10 but rather intermittently, i.e. every x seconds or n rotations of the wheel 10, and are ultimately each transmitted in a signal to the control and evaluation unit 23. There, the wheel-side measured values are used to correct, where appropriate, the vehicle-side measured values for the length of the tire contact area. This is because in the wheel 10 the length l of the tire contact area can be measured more precisely than by means of vehicle-side frequency measurement, however with the disadvantage of non-continuous measurement.

The physical variables are picked up continuously on the vehicle side and intermittently on the wheel side during travel (rotating wheel 10).

Vehicle functions are controlled precisely, dynamically and synchronously using the measured values and the wheel state variables determined therefrom, insofar as the somewhat imprecise wheel state variables which are measured continuously are correlated and corrected with the more precise wheel state variables which are measured intermittently on the wheel side. A comparison of the measured values therefore takes place and, if appropriate, the measured values or the determined wheel state variables are corrected. In this way, variables relating to measuring inaccuracies, which are measured on the vehicle side, are minimized. The wheel-side measured values which are measured and/or transmitted intermittently can always be input again into the mathematical algorithm for the evaluation of the variables measured on the vehicle side, and the accuracy of the evaluation can therefore be improved.

In this way, physical wheel state variables such as the wheel load F can be determined in a dynamically precise fashion at any time. As a result, the control of vehicle movement dynamic functions such as rollover, ABS, ESP etc. can be improved. Additionally or alternatively, it is also possible for the result values of the evaluation of the measured values which are measured on the vehicle side to be correspondingly corrected as required, instead of the measured values, by using the measured values which are measured on the wheel side. If correction factors are determined, they are then also used for the necessary correction of the vehicle-side measured values on the basis of the last comparison of the measured values, if no wheel-side measured values are currently present or if they will only be available again somewhat later.

The values which are measured on the wheel side can also be used to correspondingly define or correct the first values, for example in the case of a new vehicle, when initialization first takes place.

This method provides a high level of accuracy of the results. Devices and elements which are used in any case in the motor vehicle are used. The intermittent measurement in the wheels 10 even saves energy. Continuous vehicle movement dynamic control of motor vehicle functions in a way which is as precise as possible is therefore easily possible.

Mathematical methods/algorithms, such as formation of mean values etc., can be applied to the measured values. Both the measured values and the determined wheel state variables can be averaged over a time period in order to keep influences of random measurement errors as small as possible. In this context it is assumed that wheel variables, such as the wheel load, temperature or tire pressure, usually change relatively slowly (apart from when a tire bursts). One-off measurement errors therefore only have a small effect.

In addition, the plausibility of the measured values can also be considered, during which consideration implausible values are excluded. It is also possible to compare the measured values of various wheels 10 of the motor vehicle with one another or to check their plausibility.

It is also possible to approximate the measured values by means of a mathematical function and to calculate the desired wheel variables therefrom. The correction values can also influence the mathematical function. The measured values which are measured continuously on the vehicle side can already be corrected when the mathematical function has not yet been applied, but the measured values which are measured on the wheel side are already available.

The present invention is not restricted to the present exemplary embodiments, but rather can also be modified in any desired way without departing from the subject matter of the present invention.

An additional unbalance can also be integrated into the tire. This dead mass can be in the weight range from 2 to 15 grams. This does not influence the vehicle movement dynamics. A physical variable, such as the wheel load F, can then be determined by continuously evaluating physical variables on the vehicle. However, this provides a lower level of accuracy during the determination of the wheel load F.

In one preferred refinement a known unbalance mass, i.e. an unbalance with a known mass, is firstly made available here. Said unbalance mass is mounted on the wheel side on the wheel 10 of the vehicle. In order to determine the physical variable, the variation in the physical variable due to the known unbalance mass which is mounted on the wheel side can then be determined and detected on the vehicle side. The physical variable can then be derived therefrom.

Figure 4:
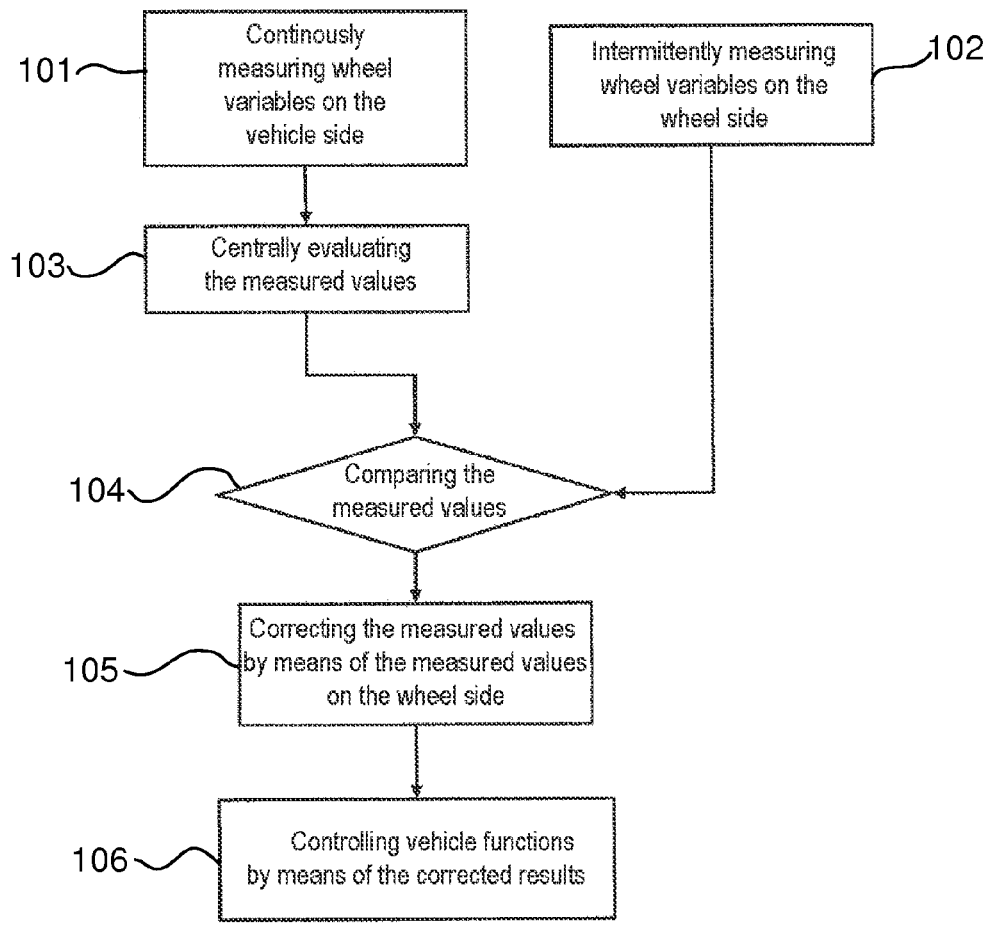
FIG. 4 shows a flowchart of a method for continuously determining tire state variables or wheel state variables of a motor vehicle wheel.

FIG. 4 shows a flowchart of a method for continuously determining tire state variables or wheel state variables of a motor vehicle wheel. In step 101, variables are continuously measured on the vehicle side. In step 102, variables are intermittently measured on the wheel side. In step 103, the measured values are centrally evaluated. In step 104, the variables measured on the vehicle side are compared with the variables measured on the wheel side. In step 105, the variables measured on the vehicle side are corrected by means of the variables measured on the wheel side. In step 106, vehicle functions are controlled by means of the corrected results.

The invention claimed is:

1. A device for continuously determining wheel state variables of a tire of a vehicle, the device comprising:

Wheel-side measuring devices each disposed in a respective wheel and configured for intermittently measuring physical variables of the wheel to provide measured values, the physical variables including a tire pressure and a length of a tire contact area;

Vehicle-side measuring devices each mounted to the vehicle in a vicinity of a respective wheel and configured for continuously measuring physical variables of the wheel to provide measured values, the physical variables including the tire pressure and the length of the tire contact area; and A control and evaluation unit connected to receive the measured values from said wheel-side measuring devices and from said vehicle-side measuring devices;

Said control and evaluation unit configured to perform a comparison by comparing the measured values provided by said vehicle-side measuring devices with the measured values provided by said wheel-side measuring devices or by comparing wheel state variables calculated from the measured values provided by said vehicle-side measuring devices with wheel state variables calculated from the measured values provided by said wheel-side measuring devices; and Said control and evaluation unit configured to correct the measured values provided by said vehicle-side measuring devices, or wheel state variables determined therefrom based on the comparison.

2. The device according to claim 1, wherein said wheel-side measuring devices are devices for measuring tire pressure or deformation.

3. The device according to claim 1, wherein said vehicle-side measuring devices are parts of control devices used in the vehicle for controlling vehicle functions in terms of vehicle movement dynamics.

4. The device according to claim 1, wherein the wheels are wheels of a passenger car, truck, motor cycle, utility vehicle, or aircraft.

5. The device according to claim 1, wherein an unbalance mass is present on the wheel side and mounted on the wheel.

6. The device according to claim 1, wherein said control and evaluation unit is configured to determine that the measured values provided by said vehicle-side measuring devices need to be corrected by comparing the measured values provided by said vehicle-side measuring devices with the measured values provided by said wheel-side measuring devices.

7. The device according to claim 1, wherein said control and evaluation unit is configured to correct the measured values provided by said vehicle-side measuring devices, or wheel state variables determined therefrom by overwriting the measured values provided by said vehicle-side measuring devices, or wheel state variables determined therefrom with the measured values provided by said wheel-side measuring devices, or wheel state variables determined therefrom.

8. The device according to claim 1, wherein said control and evaluation unit is configured to form correction factors to correct the measured values provided by said vehicle-side measuring devices, or wheel state variables determined therefrom.

9. The device according to claim 1, wherein the measured values from said wheel-side measuring devices and from said vehicle-side measuring devices are encoded.

* * * * *